(12) United States Patent
Lee

(10) Patent No.: US 9,668,040 B2
(45) Date of Patent: May 30, 2017

(54) RECEIVER AND MOBILE TERMINAL DEVICE HAVING THE SAME

(71) Applicant: Samsung Electronics Co., Ltd., Gyeonggi-do (KR)

(72) Inventor: Sangho Lee, Gyeonggi-do (KR)

(73) Assignee: SAMSUNG ELECTRONICS CO., LTD, Suwon-si, Gyeonggi-Do (KR)

( * ) Notice: Subject to any disclaimer, the term of this patent is extended or adjusted under 35 U.S.C. 154(b) by 383 days.

(21) Appl. No.: 14/245,948

(22) Filed: Apr. 4, 2014

(65) Prior Publication Data

US 2014/0301578 A1 Oct. 9, 2014

(30) Foreign Application Priority Data

Apr. 4, 2013 (KR) ........................ 10-2013-0036942

(51) Int. Cl.
| | | |
|---|---|---|
| H04R 1/02 | (2006.01) | |
| G06F 1/16 | (2006.01) | |
| H04R 1/06 | (2006.01) | |
| H04M 1/02 | (2006.01) | |
| H04R 9/10 | (2006.01) | |

(52) U.S. Cl.
CPC .......... H04R 1/021 (2013.01); G06F 1/1658 (2013.01); H04M 1/026 (2013.01); H04R 1/025 (2013.01); H04R 1/06 (2013.01); H04R 9/10 (2013.01); *H04R 2201/02* (2013.01); *H04R 2499/11* (2013.01)

(58) Field of Classification Search
CPC ........................... H04R 1/021; H04R 2201/02
USPC ........ 318/114; 370/252, 338, 221, 254, 336, 370/389, 401; 375/152, 345; 381/122, 381/365, 409, 412; 455/78, 132, 140, 455/189.1, 414.2; 342/118; 422/82.05
See application file for complete search history.

(56) References Cited

U.S. PATENT DOCUMENTS

| | | | | |
|---|---|---|---|---|
| 6,724,905 | B2* | 4/2004 | Komiyama | ............. H04M 1/03 381/355 |
| 7,003,022 | B2* | 2/2006 | Urabe | ..................... G06F 17/15 375/150 |
| 7,505,603 | B2 | 3/2009 | Yoo | |

(Continued)

FOREIGN PATENT DOCUMENTS

| | | |
|---|---|---|
| KR | 10-2010-0041983 | 4/2010 |
| WO | WO 2011/015236 A1 | 2/2011 |

OTHER PUBLICATIONS

Extended European Search Report dated Oct. 2, 2014 in connection with European Patent Application No. 14163408.9; 9 pages.

*Primary Examiner* — Gerald Gauthier

(57) ABSTRACT

A receiver, a mobile terminal device having the same includes a main circuit disposed upward by a predetermined gap from a bottom surface of a bracket housed within the mobile terminal device. The receiver includes a diaphragm provided at the other side of the bracket separated by a predetermined gap from the main circuit and a container shape in which a circuit is wired within the bracket and that houses a receiver mesh in an area in which a portion of a lower surface of the container shape is opened and that mounts a magnet on an injection structure molded at a periphery of the receiver mesh and the diaphragm covers an upper portion of the receiver mesh and the magnet and a coil fixed to the diaphragm and facing the magnet.

18 Claims, 18 Drawing Sheets

(56) References Cited

U.S. PATENT DOCUMENTS

| | | | | |
|---|---|---|---|---|
| 7,830,993 B2* | 11/2010 | Riley | ............... | G01S 19/32 375/345 |
| 7,991,147 B2 | 8/2011 | Emmert | | |
| 8,160,510 B2* | 4/2012 | Kanou | ............... | H04B 1/48 455/130 |
| 8,532,071 B2* | 9/2013 | Seok | ............... | H04W 80/02 370/338 |
| 8,699,745 B2* | 4/2014 | Saiki | ............... | H04R 1/225 381/412 |
| 8,848,558 B1* | 9/2014 | Martin | ............... | H04L 41/12 370/252 |
| 2001/0053233 A1* | 12/2001 | Fukazawa | ............... | H04M 1/03 381/409 |
| 2002/0131615 A1 | 9/2002 | Komiyama et al. | | |
| 2004/0116089 A1* | 6/2004 | Lee | ............... | H04B 1/52 455/140 |
| 2005/0197084 A1* | 9/2005 | Hamasaki | ............... | H03D 7/1425 455/189.1 |
| 2006/0098838 A1 | 5/2006 | Yoo | | |
| 2006/0113932 A1* | 6/2006 | Mori | ............... | H04R 19/02 318/114 |
| 2006/0120387 A1* | 6/2006 | Yang | ............... | H04L 45/04 370/401 |
| 2007/0021080 A1* | 1/2007 | Kuriyama | ............... | H04B 1/0057 455/132 |
| 2008/0037770 A1 | 2/2008 | Emmert | | |
| 2008/0151745 A1* | 6/2008 | Rahm | ............... | H01Q 3/26 370/221 |
| 2009/0122774 A1* | 5/2009 | Seok | ............... | H04L 12/5695 370/338 |
| 2009/0303993 A1* | 12/2009 | Hochendoner | ............... | H04L 12/1895 370/389 |
| 2010/0272609 A1* | 10/2010 | Haas | ............... | G01N 21/8483 422/82.05 |
| 2012/0106774 A1 | 5/2012 | Saiki | | |
| 2013/0083688 A1* | 4/2013 | Mageed Al-Talib | ............... | H04L 29/1232 370/254 |
| 2014/0191897 A1* | 7/2014 | Perkins | ............... | G07C 9/00111 342/118 |
| 2014/0301578 A1* | 10/2014 | Lee | ............... | H04R 1/021 381/122 |
| 2015/0178567 A1* | 6/2015 | Baek | ............... | H04W 4/02 455/414.2 |
| 2016/0029403 A1* | 1/2016 | Roy | ............... | H04W 72/0406 370/336 |

\* cited by examiner

FIG. 9
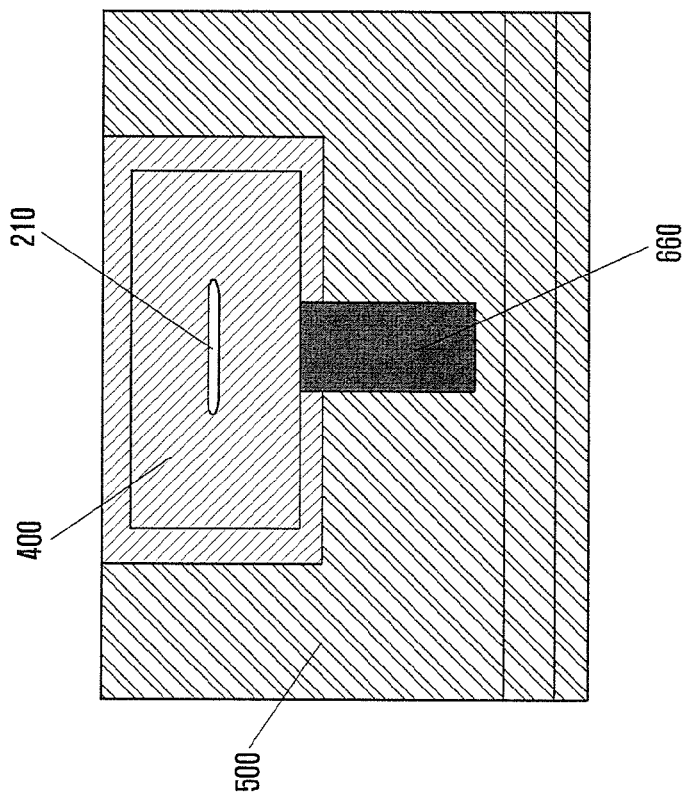
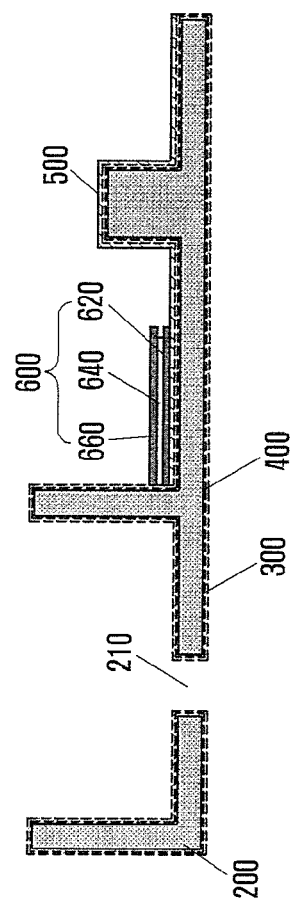

FIG. 10
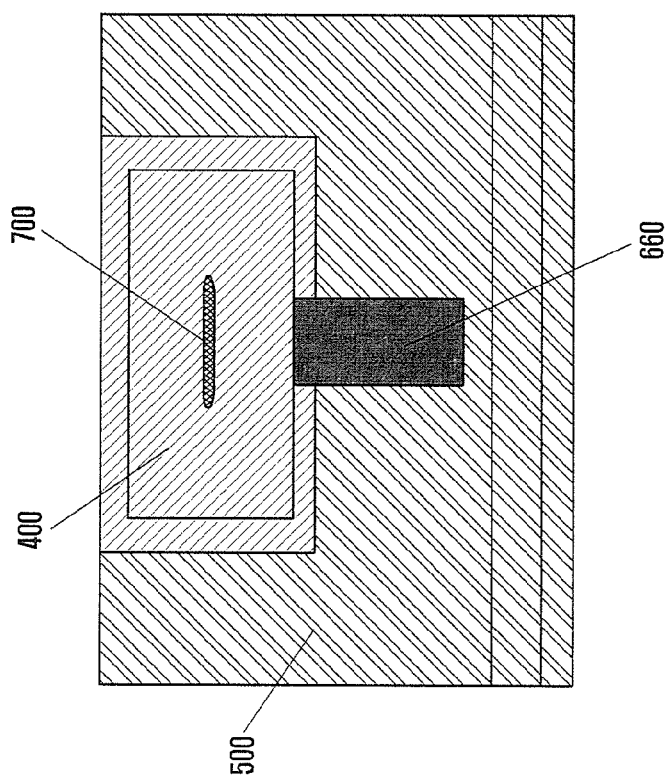
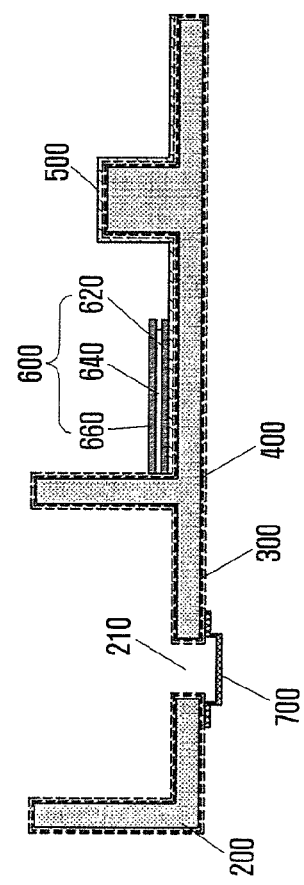

FIG. 11
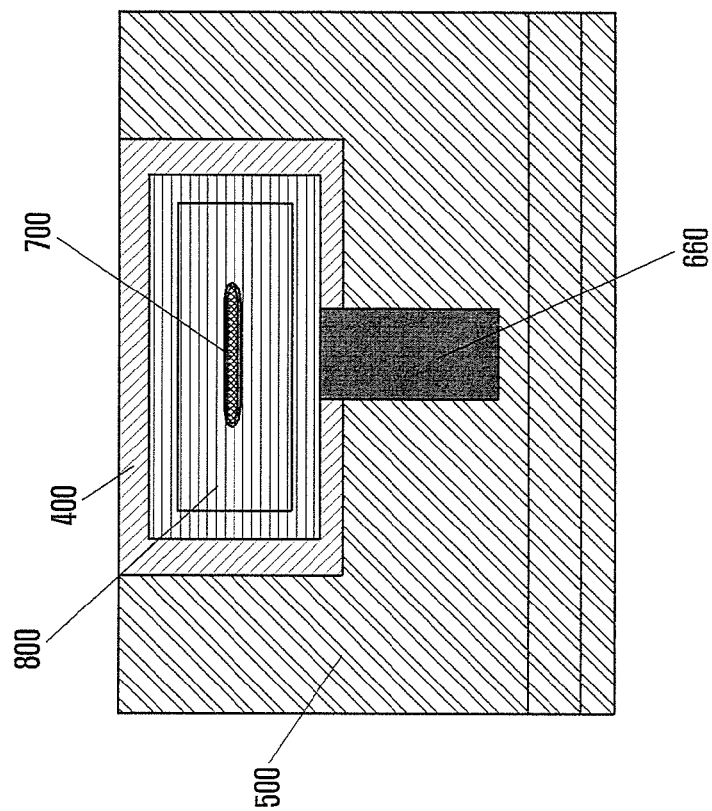
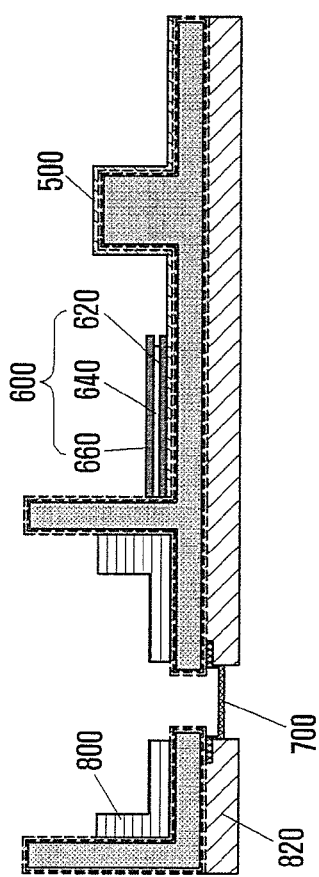

RECEIVER AND MOBILE TERMINAL DEVICE HAVING THE SAME

CROSS-REFERENCE TO RELATED APPLICATION(S) AND CLAIM OF PRIORITY

The present application is related to and claims the benefit under 35 U.S.C. §119(a) of a Korean patent application filed on Apr. 4, 2013 in the Korean Intellectual Property Office and assigned Serial No. 10-2013-0036942, the entire disclosure of which is hereby incorporated by reference.

TECHNICAL FIELD

The present disclosure relates to a receiver, a mobile terminal device having the same, and a method of manufacturing the mobile terminal device, and more particularly, to a receiver, a mobile terminal device having the same, and a method of manufacturing the mobile terminal device that can reduce an entire thickness of the mobile terminal device using dead space while securing a connection structure of an internal component and a main circuit board.

BACKGROUND

In general, mobile terminal devices are devices in which users carry and provide a communication function, electronic scheduler function, multimedia function, and broadcasting receiving function.

When such a mobile terminal device provides a basic communication function, the mobile terminal device should essentially have a receiver. The receiver is generally formed with a magnet, voice coil, and diaphragm. When a current flows to the voice coil under a line of magnet force formed by the magnet, a Lorentz force occurs. As the voice coil vibrates the diaphragm by this force, while air contacting with the diaphragm vibrates, a sound wave occurs. The receiver is electrically connected to a main circuit board (PCB) provided at the inside of the mobile terminal device to transmit and receive a signal.

However, convention technology that connects such a receiver and PCB has the following problem.

FIG. 1 illustrates a diagram of a structure of a convention speaker and PCB.

Referring to FIG. 1, in a structure of a conventional receiver 10, an occupying area of a grill 40 to house the receiver 10 separately exists, and because a mounting portion of such a grill 40 becomes dead space that is not essentially used, a problem exists that the mounting portion of the grill 40 operates as an obstacle in reducing an entire thickness of a mobile terminal device. Further, because a component such as the grill 40 is fixed to a bracket 20 using a double-sided tape 30, a problem exists that the component is not actually securely coupled.

Further, when connecting the receiver 10 to a PCB 90, in an upper end portion of one side of the receiver 10, a receiver component and the PCB 90 are connected through a Flexible PCB (FPCB) 94, and by such a structure, an entire thickness of the mobile terminal device is formed.

Further, when the mobile terminal device receives an impact from the outside, the exposed FPCB 94 and the grill 40 fixed with the double-sided tape 30 cannot ensure secure coupling of the receiver 10. Thereby, a structure of the conventional receiver 10 and the PCB 90 connected thereto may cause a problem of performance failure and quality deterioration.

SUMMARY

To address the above-discussed deficiencies, it is a primary object to provide a communication method and apparatus capable of reducing an entire thickness of the mobile terminal device using dead space while securing a connection structure of an internal component and a main circuit board.

The present disclosure has been made in view of the above problems, and provides a receiver, a mobile terminal device having the same, and a method of manufacturing the mobile terminal device that can reduce a thickness of the mobile terminal device having a receiver and that can embody a secure coupling structure of the receiver and safe electrical connection between the receiver and a PCB.

In accordance with an aspect of the present disclosure, a mobile terminal device has a receiver. The receiver includes: a main circuit disposed upward by a predetermined gap from a bottom surface of a bracket housed within the mobile terminal device; a receiver having a diaphragm provided at the other side of the bracket separated by a predetermined gap from the main circuit and having a container shape in which a circuit is wired within the bracket and that houses a receiver mesh in an area in which a portion of a lower surface of the container shape is opened and that mounts a magnet on an injection structure molded at a periphery of the receiver mesh, wherein the diaphragm covers an upper portion of the receiver mesh and the magnet and a coil fixed to the diaphragm and facing the magnet; and a contact portion extended from an internal circuit of the receiver to have a structure electrically connected to the main circuit.

In accordance with another aspect of the present disclosure, a receiver of a mobile terminal device includes: a bracket including a first area of a container shape in which a portion of a lower surface is opened and a second area in which a main circuit board (PCB) is housed at the other side adjacent to the first area; a receiver mesh housed at the opened lower surface of the first area; an injection structure that exposes the receiver mesh and that is molded in the first area; a magnet fixed on the injection structure and having a groove in a portion of an upper surface; a diaphragm fixed by a fixing point formed in an upper portion of the injection structure and that covers an upper portion of the magnet and the receiver mesh; a coil fixed to the diaphragm and extended to face the groove from the diaphragm; and a contact line extended from the inside of the first area of the bracket to the PCB and that electrically connects the PCB and an electric wire mounted within the bracket.

In accordance with another aspect of the present disclosure, a method of manufacturing a mobile terminal device having a receiver includes: forming a bracket including a first area of a container shape in which a portion of a lower surface is opened and in which an internal circuit is wired and a second area having a portion protruded from the lower surface; sequentially forming a corrosion prevention layer, a base coating layer, and a ground shielding layer in the bracket; forming a first insulation layer in a portion of the second area extended from the first area; forming a conductive layer connected to an internal circuit of the first area in an upper portion of the first insulation layer; forming a second insulation layer on the conductive layer; bonding a receiver mesh in a lower surface of an opened bracket of the first area; performing injection molding at an upper surface and a rear surface of the bracket, except for an upper surface of the second area; fixing a magnet having a groove in a portion of an upper surface on an injection portion of the first area; covering a diaphragm in an upper portion of the receiver mesh and the magnet; fixing a coil facing the groove in an upper portion of the magnet to the diaphragm; providing a main circuit board (PCB) on a protruded bracket of the second area; and forming an electric contact line from the conductive layer to the PCB.

In accordance with another aspect of the present disclosure, a mobile terminal device includes: a main circuit disposed upward by a predetermined gap from a bottom surface of a bracket; an electric material provided at the other side of the bracket separated by a predetermined gap from the main circuit and mounted at the container-shaped inside of the bracket in which a circuit is wired at the inside; and a contact portion electrically connected to the electric material and that penetrates a hole formed at a side surface and/or a lower surface of the container-shaped bracket and that connects the main circuit and the electric material.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 3 to 17 illustrate cross-sectional views of a process of manufacturing the receiver of FIG. 2.

DETAILED DESCRIPTION

Figure 1:
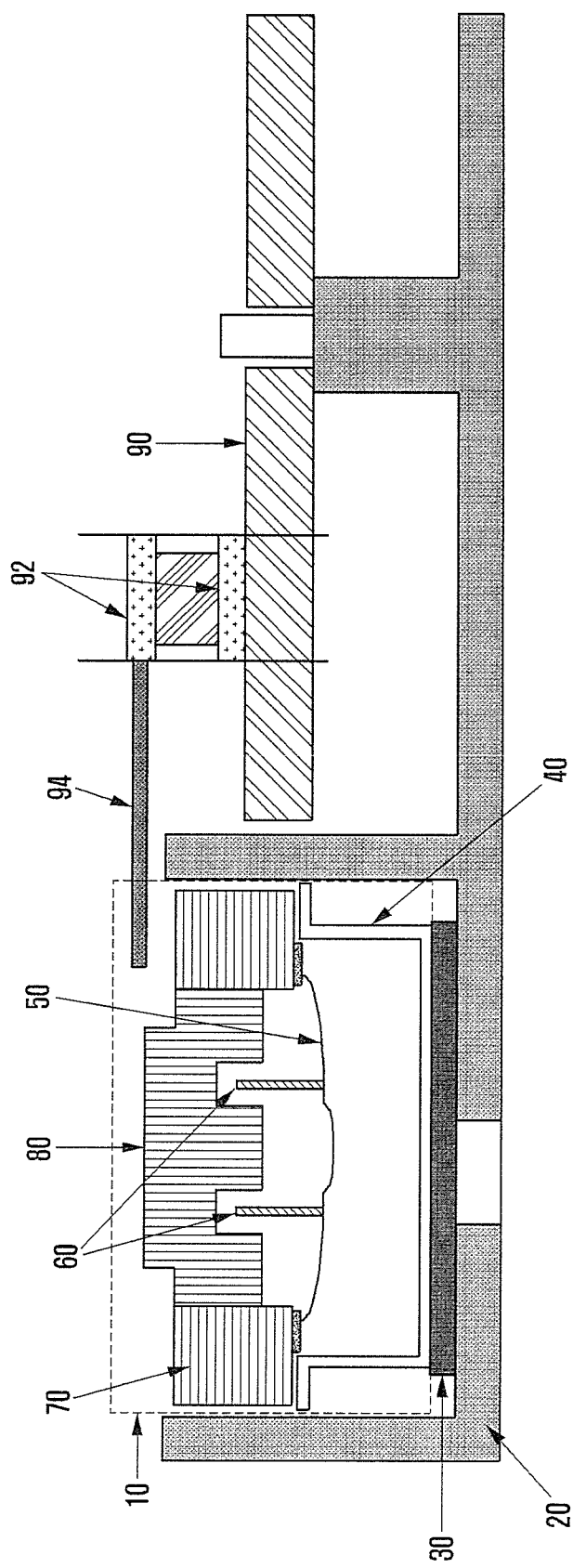
FIG. 1 illustrates a diagram of a structure of a conventional general speaker and PCB.

FIGS. 2 through 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system and method.

Hereinafter, example embodiments of the present disclosure are described in detail with reference to the accompanying drawings. The same reference numbers are used throughout the drawings to refer to the same or like parts. The views in the drawings are schematic views only, and are not intended to be to scale or correctly proportioned. Detailed descriptions of well-known functions and structures incorporated herein may be omitted to avoid obscuring the subject matter of the present disclosure.

In an example embodiment of the present disclosure, a mobile terminal device may be applied to information and communication devices and multimedia devices such as a tablet Personal Computer (PC), mobile communication terminal, mobile phone, Personal Digital Assistant (PDA), smart phone, International Mobile Telecommunication 2000 (IMT-2000) terminal, Code Division Multiple Access (CDMA) terminal, Wideband Code Division Multiple Access (WCDMA) terminal, Global System for Mobile communication (GSM) terminal, General Packet Radio Service (GPRS) terminal, Enhanced Data GSM Environment (EDGE) terminal, Universal Mobile Telecommunication Service (UMTS) terminal, digital broadcasting terminal, and Automated Teller Machine (ATM), and applications thereof.

Figure 2:
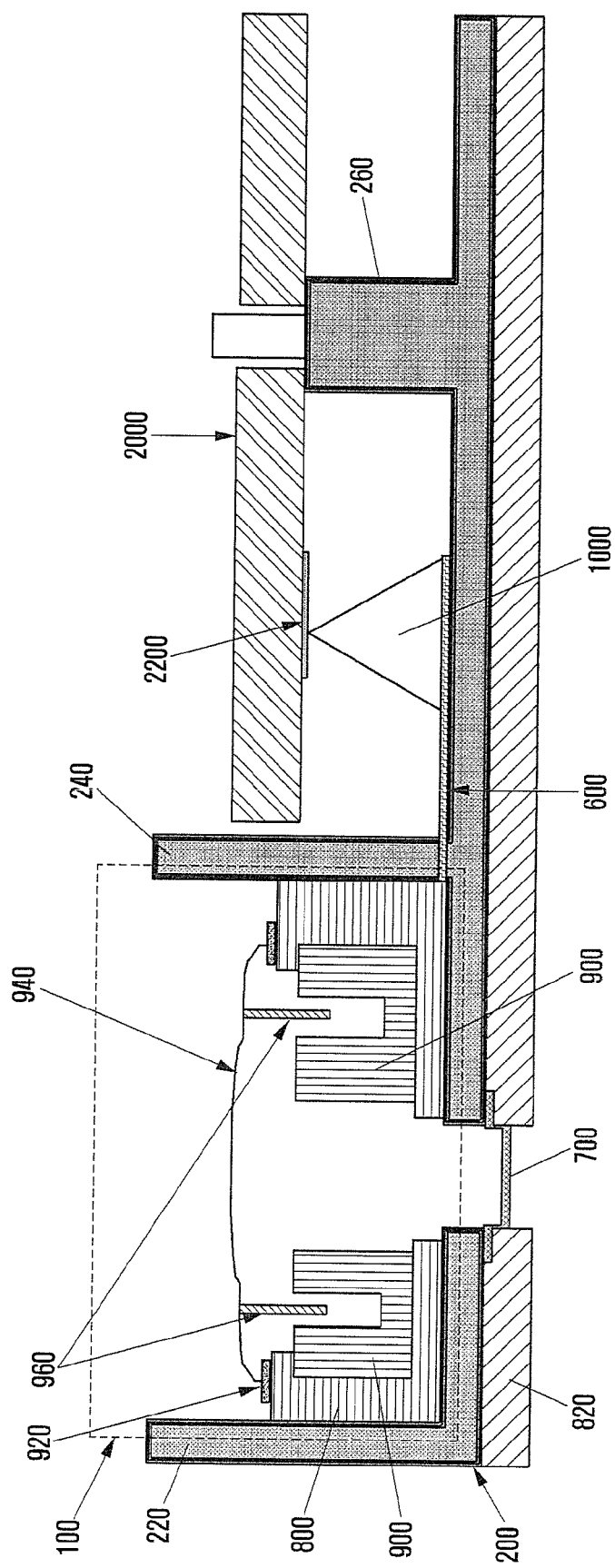
FIG. 2 illustrates a diagram of a structure of a receiver and a PCB of a mobile terminal device according to an example embodiment of the present disclosure.

FIG. 2 illustrates a diagram of a structure of a receiver and a PCB of a mobile terminal device according to an example embodiment of the present disclosure.

Referring to FIG. 2, the receiver of the mobile terminal device according to the present example embodiment includes a bracket 200, receiver mesh 700, injection structures 800 and 820, magnet 900, fixing member 920, diaphragm 940, coil 960, and contact lines 600 and 1000.

The bracket 200 is formed with a container-shaped first area and a second area that houses a PCB 2000 at the other side adjacent to the first area. The first area may be formed in a container shape in which a portion 210 of a lower surface is opened, and the second area may be formed in a shape 260 in which a portion is protruded from a lower surface of the bracket 200 so as to house the PCB 2000.

The bracket 200 of the first area may include a side wall 220 protruded upward from a lower surface of the bracket 200 so as to form a container-shape. In the present example embodiment, at the inside of a lower surface and/or a side wall of the container-shaped bracket 200, an internal circuit may be included. The internal circuit is electrically connected to a receiver 100 to transmit and receive a signal.

The lower surface and/or the side wall of the bracket 200 of the first area have a penetration hole in a portion thereof and house the contact film 600 through the penetration hole. The contact film 600 is connected to a finger contact portion 1000 provided in the bracket 200 of the second area to electrically connect the receiver 100 and the PCB 2000.

By such a structure, in an upper portion of the bracket 200, the PCB 2000 and the receiver 100 provided within the container-shaped bracket 200 may be connected in a lower portion through a penetration hole formed in a lower surface and/or a side wall of the bracket 200 even without using a FPCB.

Accordingly, by a structure that close contacts a contact line that electrically connects the receiver 100 and the PCB 2000 with the lower surface and/or the side wall of the bracket 200 and that penetrates a metal line to the inside of the bracket 200, an electrical connection between components can be more securely performed.

Further, for an electrical connection between the receiver 100 and the PCB 2000, by providing an internal circuit within the bracket 200 and a metal line that penetrates the bracket 200 without necessity to add a component such as a FPCB, components can have a simple structure.

The bracket 200 may be formed using at least one of heat resistance plastic, Polycarbonate (PC), Polyethylene Terephthalate Glycol (PETG), Polyethylene (PE), and Polypropylene (PP) and may be formed through at least one process of extrusion, blow shaping, injection molding, compression molding, and vacuum shaping using the material. Alternatively, the bracket 200 may be formed through at least one of a plurality of plastic shaping methods such as rotation type powder shaping, molding, and cold dipping.

The receiver mesh 700 has a structure in which a plurality of through-holes is constantly bored at a surface thereof, and sound/voice may be spread to the inside and the outside through the through-hole.

The receiver mesh 700 may be housed in an opened lower surface 210 of the first area of the bracket 200, and at a rear surface of the bracket 200, an edge portion of the receiver mesh 700 may be attached and fixed to a circumference of the opened lower surface 210 of the first area. The receiver mesh 700 may be fixed using at least one of a double-sided tape, an adhesive, fusion-bonding, thermo compression, and soldering and a fixing method of the receiver mesh 700 is not limited thereto.

The receiver mesh 700 may be disposed at the same horizontal line as that of a circumference of the opened lower surface 210 of the first area or may be protruded or depressed further than a circumference of the opened lower surface 210 and a structure thereof is not limited thereto.

The receiver mesh 700 may be formed by injection of a synthetic resin or may be made of a metal material, for example at least one of stainless steel (SUS) and titanium (Ti) or a combination thereof.

The injection structures 800 and 820 expose an opened lower surface 210 of the first area in which the receiver mesh 700 is housed and are formed at the inside of the first area and a rear surface of the bracket 200. That is, the injection structures 800 and 820 may be formed by injection molding that injects an injection material melt in a high temperature into an injection mold at an upper surface and a rear surface of the bracket 200, except for an upper surface of the second area.

The magnet 900 is formed in a structure fixed on the injection structure 800 formed at the container-shaped inside of the first area bracket 200 and having a groove in a portion of an upper surface thereof.

In an upper portion of the injection structure 800 formed in the container-shaped inside of the first area bracket 200, the fixing member 920 to fix the diaphragm 940 is provided. That is, the fixing member 920 is formed in an upper portion of the injection structure 800 to be provided along a circumference of the container-shaped inside of the first area bracket 200.

The diaphragm 940 is fixed by the fixing member 920 and is provided to cover an upper portion of the magnet 900 and the receiver mesh 700.

The coil 960 is fixed to the diaphragm 940 and is extended to face the groove formed at an upper surface of the magnet 900 from the diaphragm 940.

Here, when a current flows to the coil 960 under a magnetic line of force formed by the magnet 900, a Lorentz force occurs. As the coil 960 vibrates the diaphragm 940 by the force, while air that contacts with the diaphragm 940 vibrates, a sound wave may occur.

The contact lines 600 and 1000 are extended from an internal circuit within the bracket 200 connected to the receiver 100 and are electrically connected to the PCB 2000.

The contact lines 600 and 1000 include a contact film 600 extended to the second area from the inside of a lower surface and/or a side wall of the bracket 200 of the first area and a finger contact portion 1000 connected between the contact film 600 and the PCB 2000 to finger contact with a pad opening portion 2200 of the PCB 2000.

The contact film 600 may be made of a conductive material, i.e., an electric wiring having a surface enclosed with an insulation layer or may be made of only a conductive material according to whether a peripheral insulation material that close contacts with the contact film 600 exists. The conductive material may be formed with at least one of metal, doped polysilicon, or doped silicon or a combination thereof. The metal may be formed with at least one of silver (Ag) paste, copper (Cu), and gold or a combination thereof.

The contact film 600 may be simultaneously disposed in the first area and the second area by penetrating a penetration hole formed in a portion of the lower surface and/or the side wall of the first area bracket 200. The contact film 600 contacts with an electric wiring mounted at the inside of the first area bracket 200 to be electrically connected to the receiver 100.

The finger contact portion 1000 electrically connects the contact film 600 extended to an upper surface of the second area bracket 200 and the PCB 2000 disposed upward by a predetermined gap from a bottom surface of the second area bracket 200. In an embodiment, the finger contact portion 1000 is connected between the contact film 600 and the PCB 2000 to finger contact with the pad opening portion 2200 provided at a lower surface of the PCB 2000.

The finger contact portion 1000 is extended from the contact film 600 to have a structure integrally formed with the contact film 600 and is separately formed with the contact film 600 to have a structure that electrically contacts later and a connection structure thereof is not limited thereto.

In the finger contact portion 1000, an area contacting with the contact film 600 may be greater than or equal to an area contacting with the pad opening portion 2200, as shown in FIG. 2 and a shape and a structure of the finger contact portion 1000 are not limited thereto.

By such a structure, in the present example embodiment, in a lower portion of the PCB 2000, by connecting the receiver 100 and the PCB 2000 using space between the PCB 2000 and the bracket 200, an area of upper space of the PCB 2000 and the bracket 200 can be secured.

Further, in the present example embodiment, at the container-shaped inside of the bracket 200, by integrally forming the receiver 100, in order to provide a receiver at the container-shaped inside of the conventional bracket 20 shown in FIG. 1, dead space generated when mounting the grill 40 can be used and thus a thickness of the mobile terminal device can be reduced. Further, by directly mounting a component of the receiver 100 in the container-shaped inside of the bracket 200, the receiver component can be more securely fixed.

Hereinafter, a method of manufacturing a receiver and a mobile terminal device having the same according to an example embodiment of the present disclosure is described in detail with reference to FIGS. 3 to 18.

Figure 17:
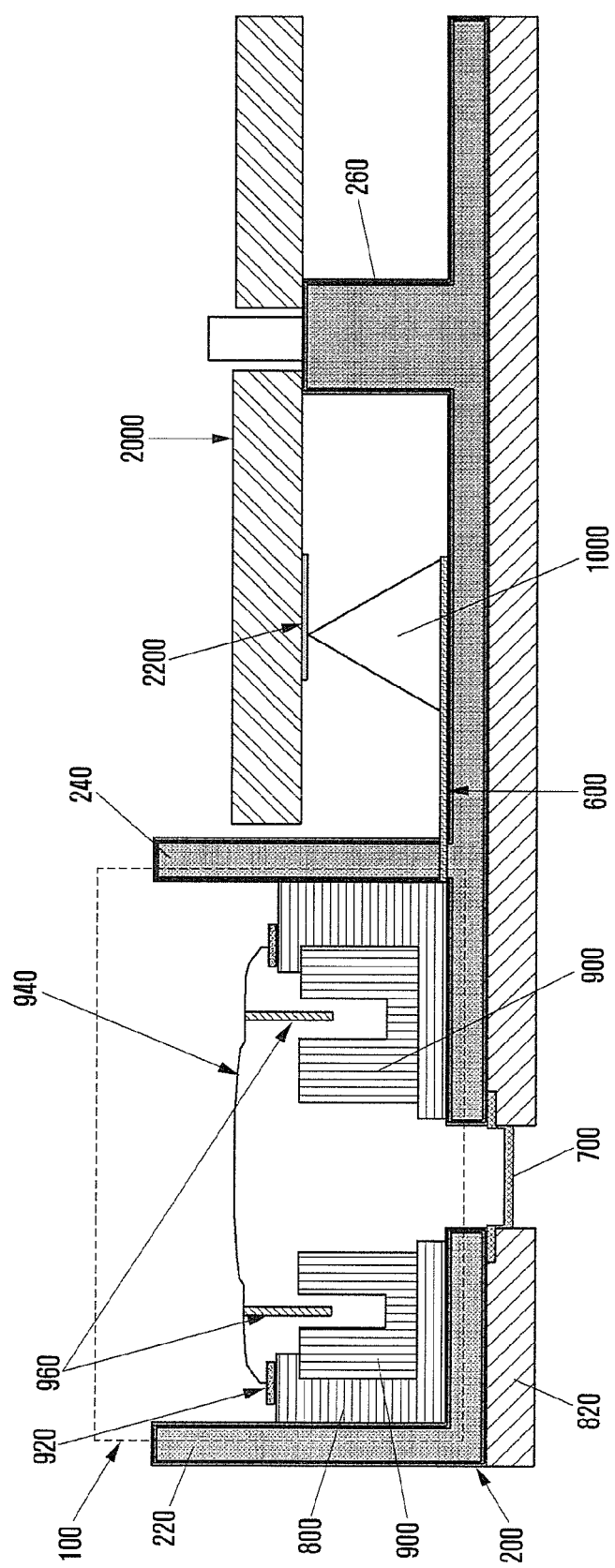
Figure 18:
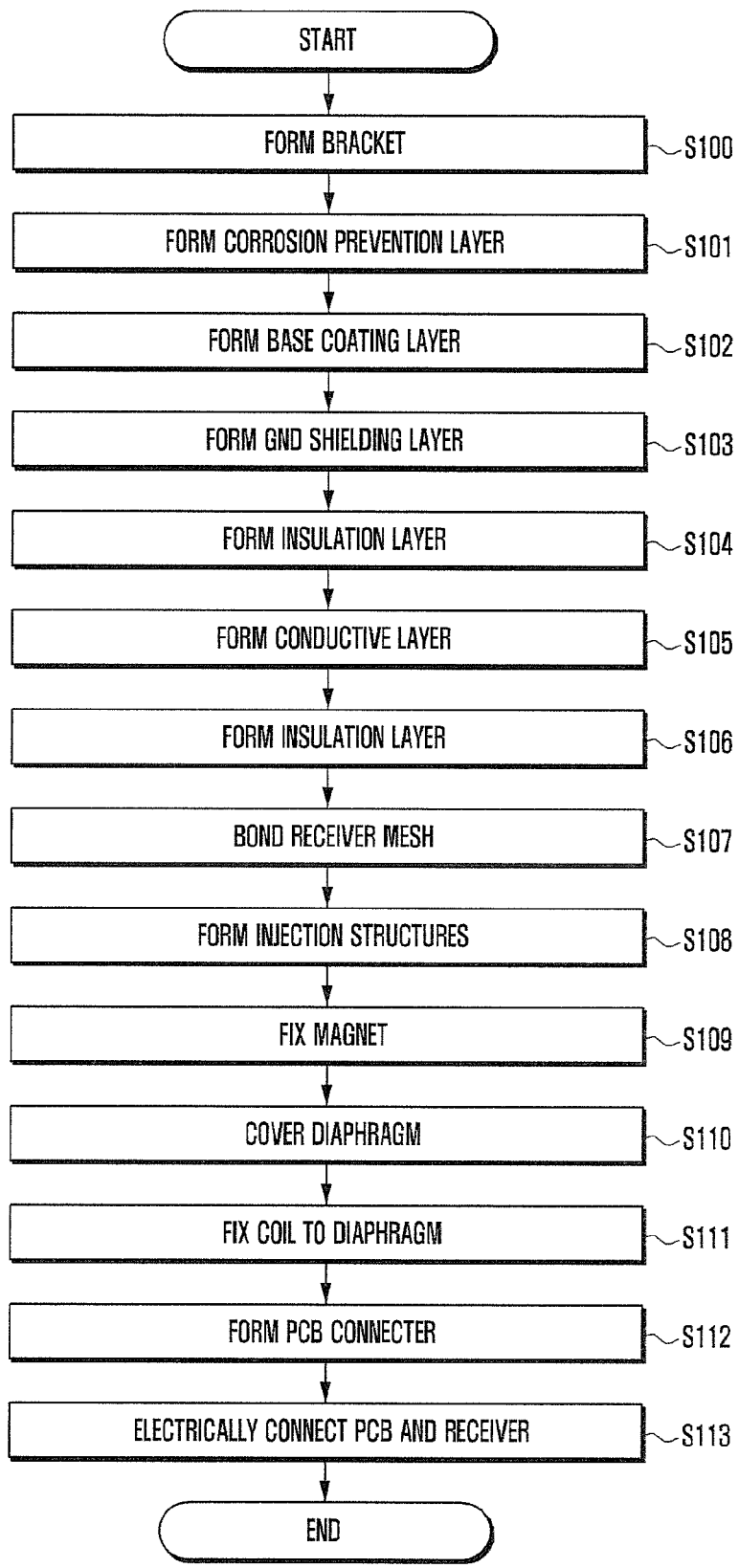
FIG. 18 illustrates a process of manufacturing the receiver of FIG. 2.

FIGS. 3 to 17 illustrates cross-sectional views of a process of manufacturing the receiver of FIG. 2 and a mobile terminal device having the same, and FIG. 18 illustrates a process of manufacturing the receiver of FIG. 2 and a mobile terminal device having the same.

Figure 3:
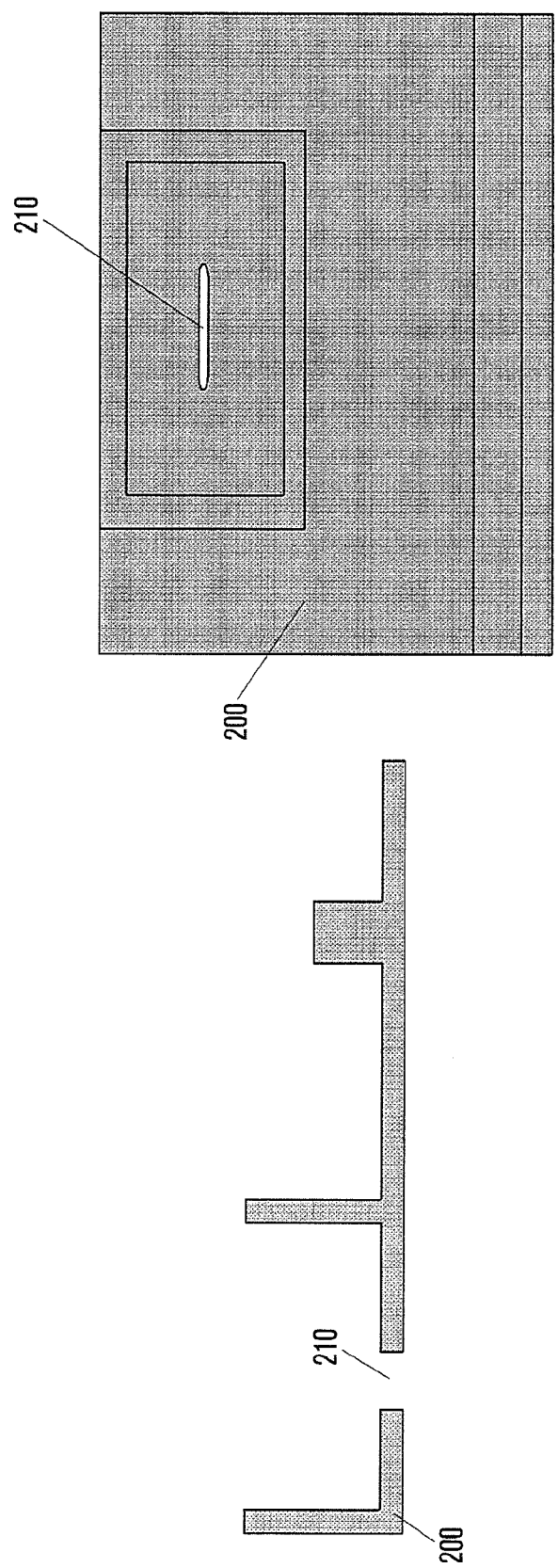

Referring to FIG. 3, the bracket 200 including a container-shaped first area in which a portion 210 of a lower surface is opened and in which an internal circuit is wired and a second area having a portion 260 protruded from a lower surface is formed (operation S100).

The bracket 200 may be formed using at least one of heat resistance plastic, Polycarbonate (PC), Polyethylene Terephthalate Glycol (PETG), Polyethylene (PE), and Polypropylene (PP) and may be formed using the material through at least one process of extrusion, blow shaping, injection molding, compression molding, and vacuum shaping. Alternatively, the bracket 200 may be formed through at least one of a plurality of plastic shaping methods such as rotation type powder shaping, molding, and cold dipping.

Figure 4:
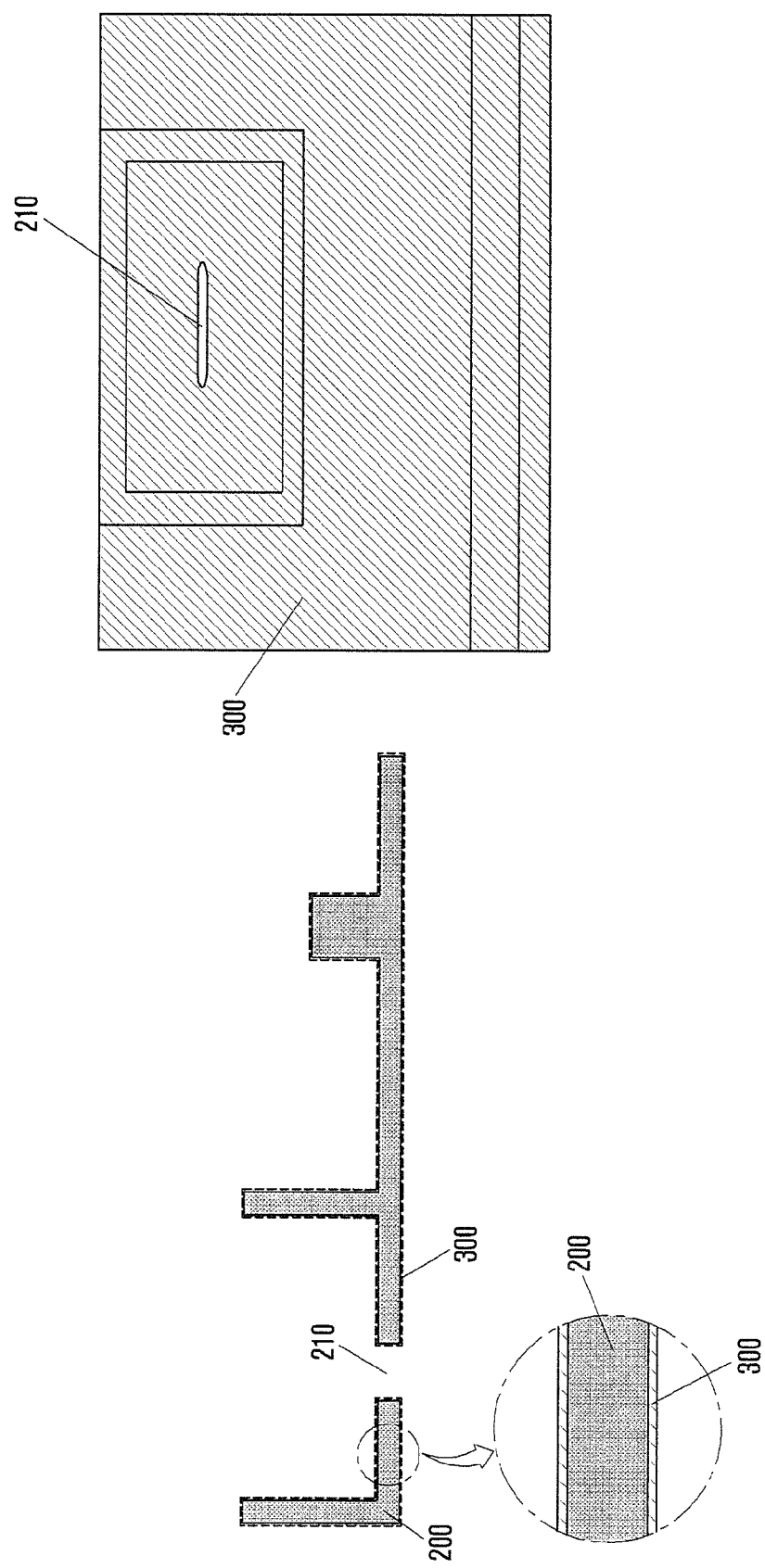

Thereafter, as shown in FIG. 4, in the bracket 200, a corrosion prevention layer 300 is formed (operation S101). The corrosion prevention layer 300 may be formed using at least one method of, for example plating, coating, surface oxide film forming, and an electric method.

Figure 5:
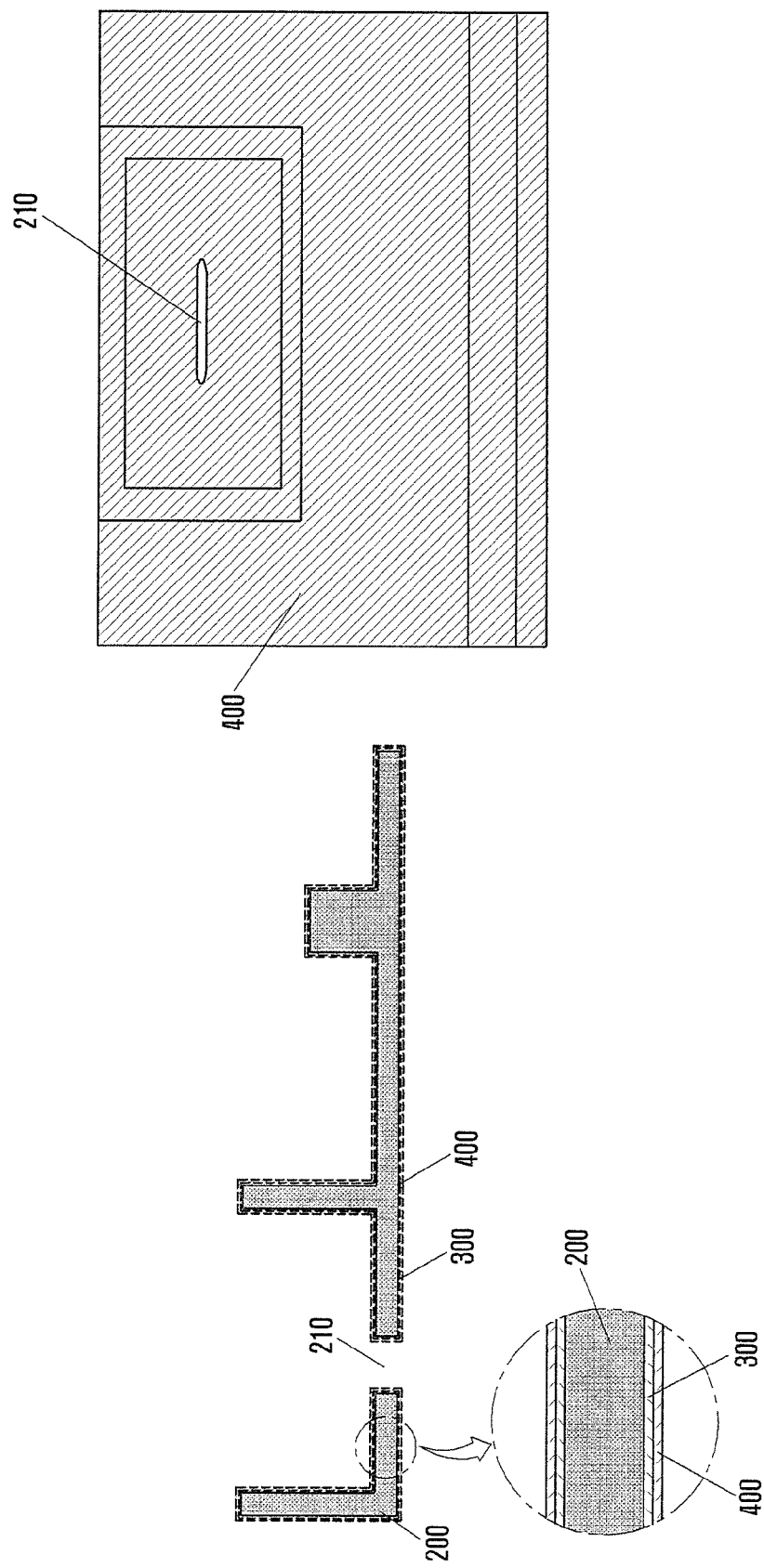

Thereafter, as shown in FIG. 5, in the bracket 200 in which the corrosion prevention layer 300 is formed, a base coating layer 400 is formed (operation S102). The base coating layer 400 may be a coating layer having, for example corrosion resistance, chemical resistance, heat resistance, and abrasion resistance. Such a base coating layer 400 may be formed using at least one of a Chemical Vapor Deposition (CVD) process, Plasma Enhanced CVD (PE-CVD) process, and Sol-gel method.

Figure 6:
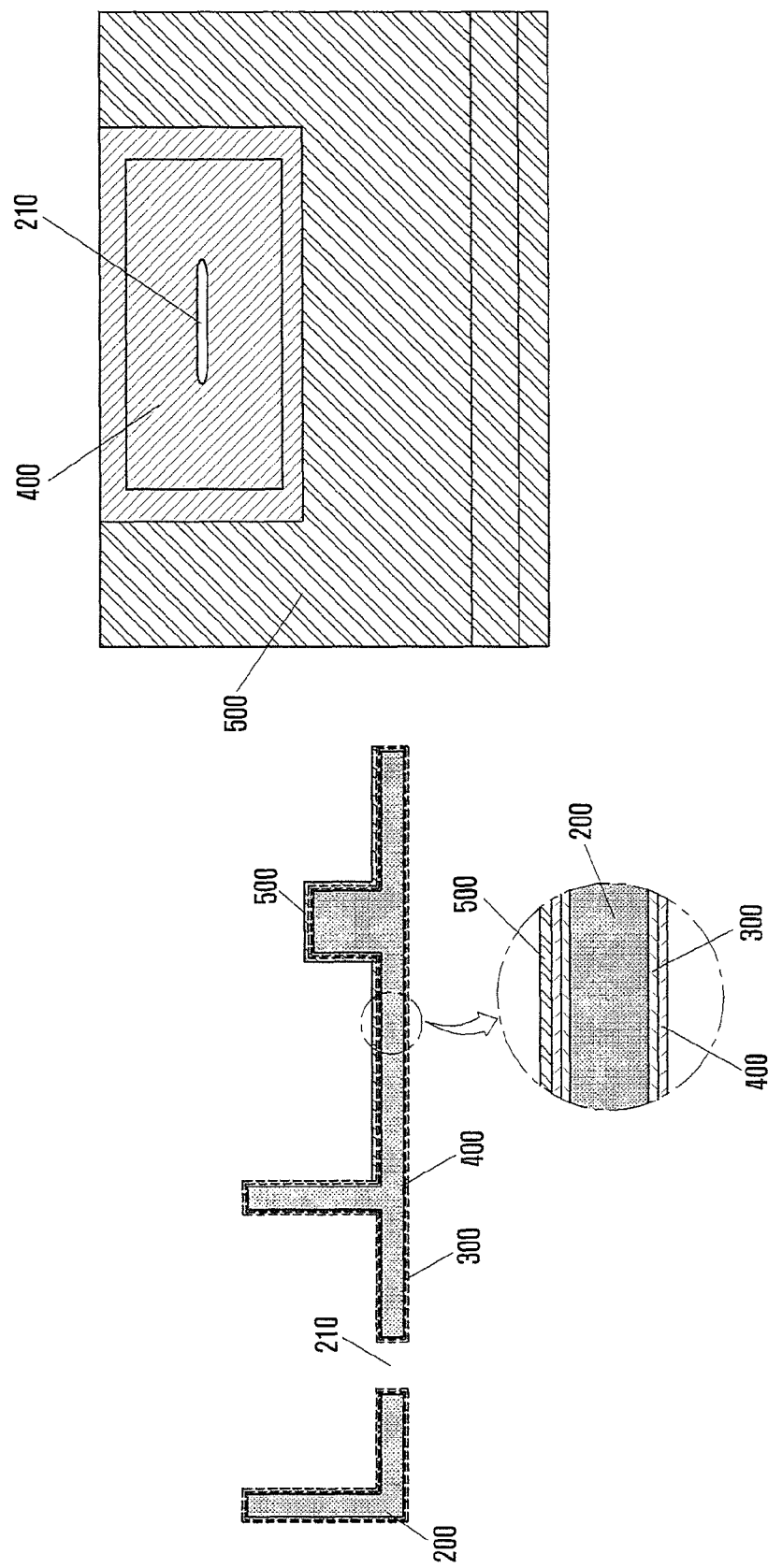

Thereafter, as shown in FIG. 6, in the bracket 200 of the second area, a ground shielding (GND shielding) layer 500 is formed (operation S103). The GND shielding layer 500 shields conductive noise transferred from the outside and is provided to ground an internal electric component.

Figure 7:
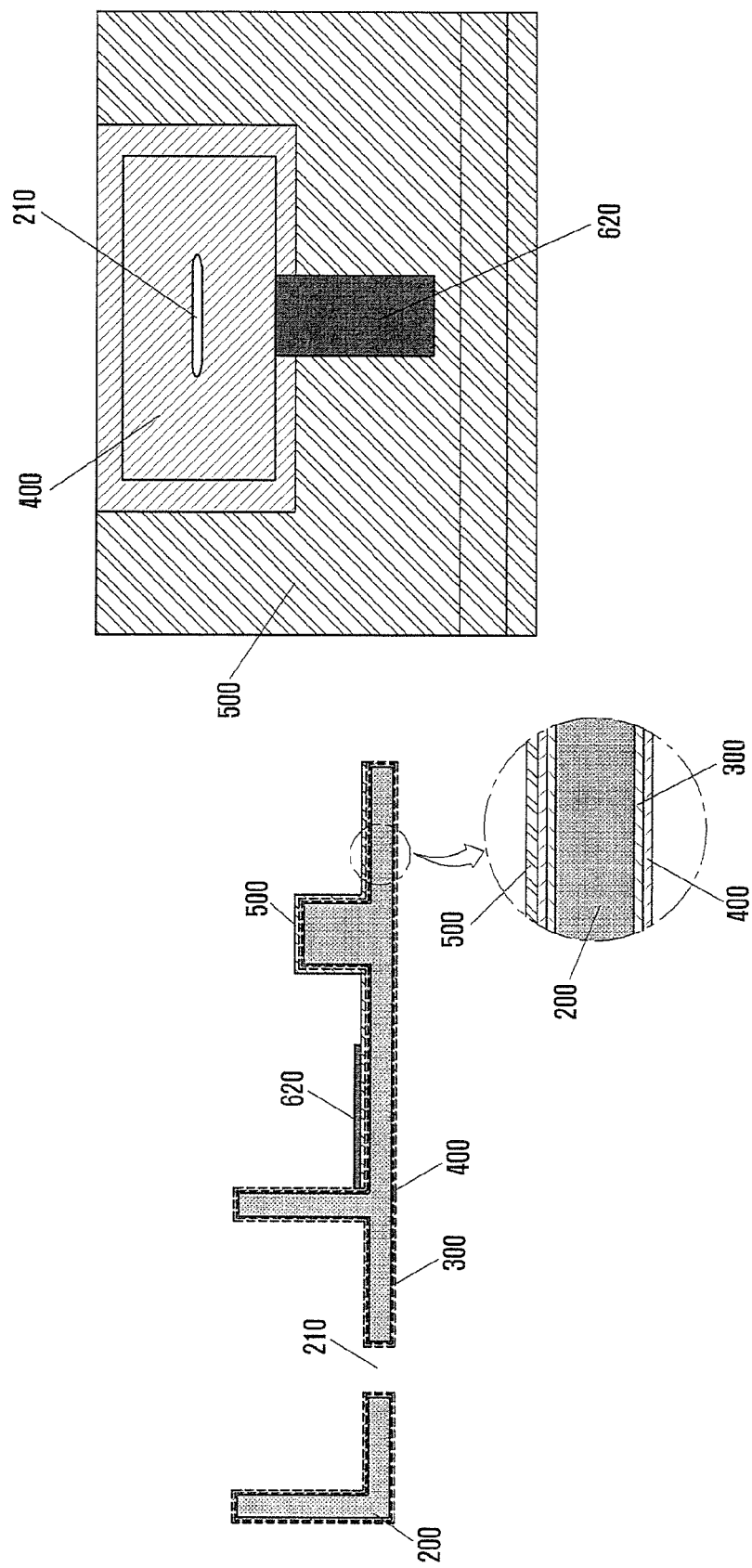
Figure 8:
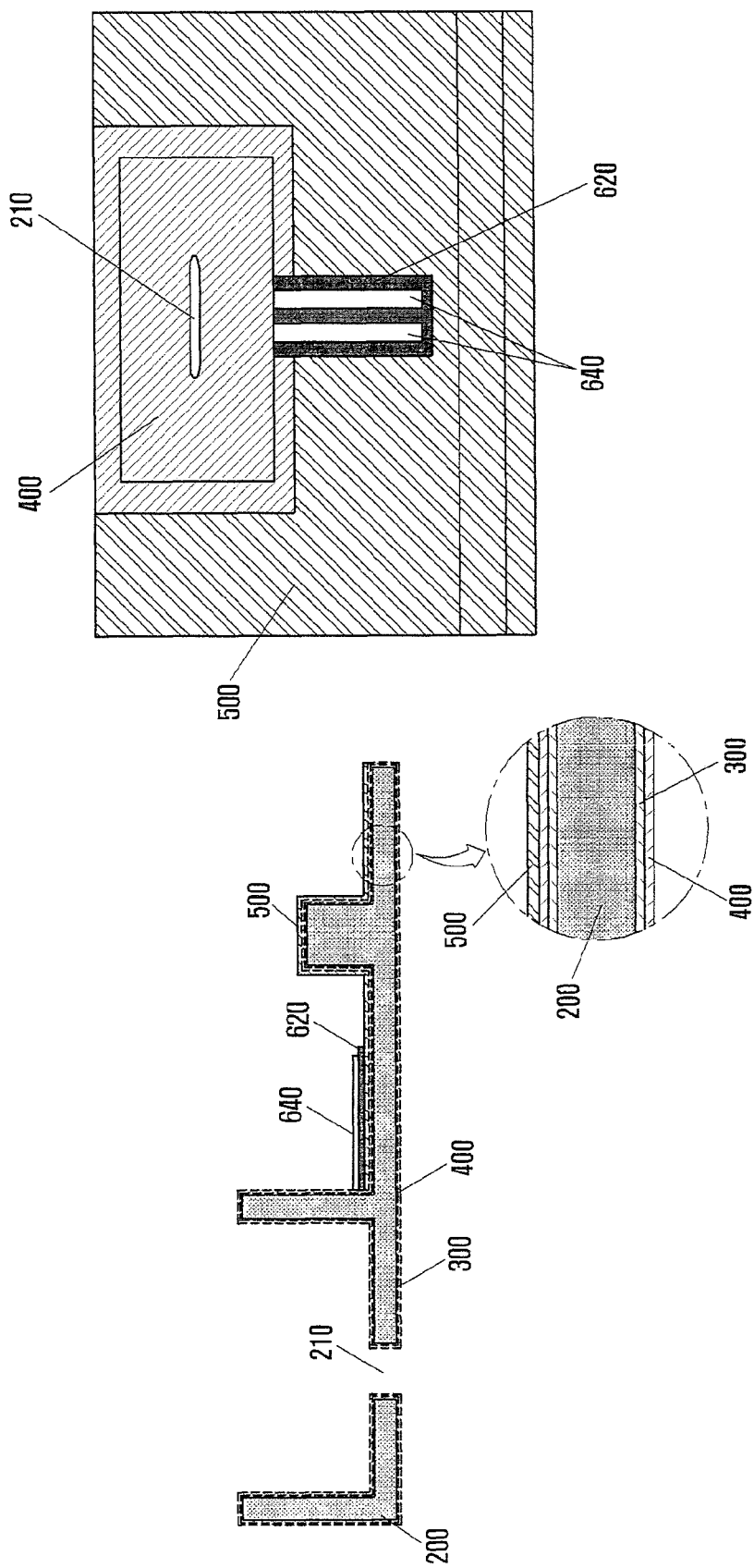

Thereafter, as sequentially shown in FIGS. 7 to 9, in order to form the contact film 600, in a portion of the bracket 200 of the second area, an insulation layer 620 is formed, and on the insulation layer 620, a conductive layer 640 connected to an internal circuit of the first area bracket 200 is formed, and on the conductive layer 640, an insulation layer 660 is formed (operations S104 to S106).

The insulation layers 620 and 660 may be formed with at least one of silicon oxide, silicon dioxide, silicon nitroxide, and silicon nitride or a combination thereof.

The conductive layer 640 may be disposed in at least one line form on the insulation layer 620, and the conductive layer 640 is a conductive material and may be formed with, for example at least one of metal, doped polysilicon, and doped silicone or a combination thereof, and the metal may be formed with at least one of silver paste, copper, and gold.

The contact film 600 is housed to penetrate a penetration hole formed in a portion of the lower surface and/or the side wall of the first area bracket 200 and may be simultaneously disposed at the first area and the second area. The conductive layer 640 of the contact film 600 contacts with an electric wiring mounted at the inside of the first area bracket 200 to be electrically connected to the receiver 100.

Thereafter, as shown in FIG. 10, at the lower surface 210 of the opened bracket 200 of the first area, the receiver mesh 700 is bonded (operation S107).

The receiver mesh 700 has a structure in which a plurality of through-holes is constantly bored at a surface thereof, and sound/voice may be spread to the inside and the outside through the through-hole. At a rear surface of the bracket 200, an edge portion of the receiver mesh 700 may be attached and fixed to a circumference of the opened lower surface 210 of the first area. The receiver mesh 700 may be fixed using at least one of a double-sided tape, an adhesive, fusion-bonding, thermo compression, and soldering and a fixing method of the receiver mesh 700 is not limited thereto. The receiver mesh 700 may be disposed at the same horizontal line as that of a circumference of the opened lower surface 210 of the first area or may be protruded or depressed further than a circumference of the opened lower surface 210 and a structure thereof is not limited thereto. The receiver mesh 700 may be formed by injection of a synthetic resin or may be made of a metal material, for example at least one of stainless steel (SUS) and titanium (Ti) or a combination thereof.

Thereafter, as shown in FIG. 11, at an upper surface and a rear surface of the bracket 200, except for an upper surface of the second area, by injection molding, the injection structures 800 and 820 are formed (operation S108). That is, the injection structures 800 and 820 may expose the opened lower surface 210 of the first area in which the receiver mesh 700 is housed and be formed at the container-shaped inside of the bracket 200 and a rear surface of the bracket 200.

Figure 12:
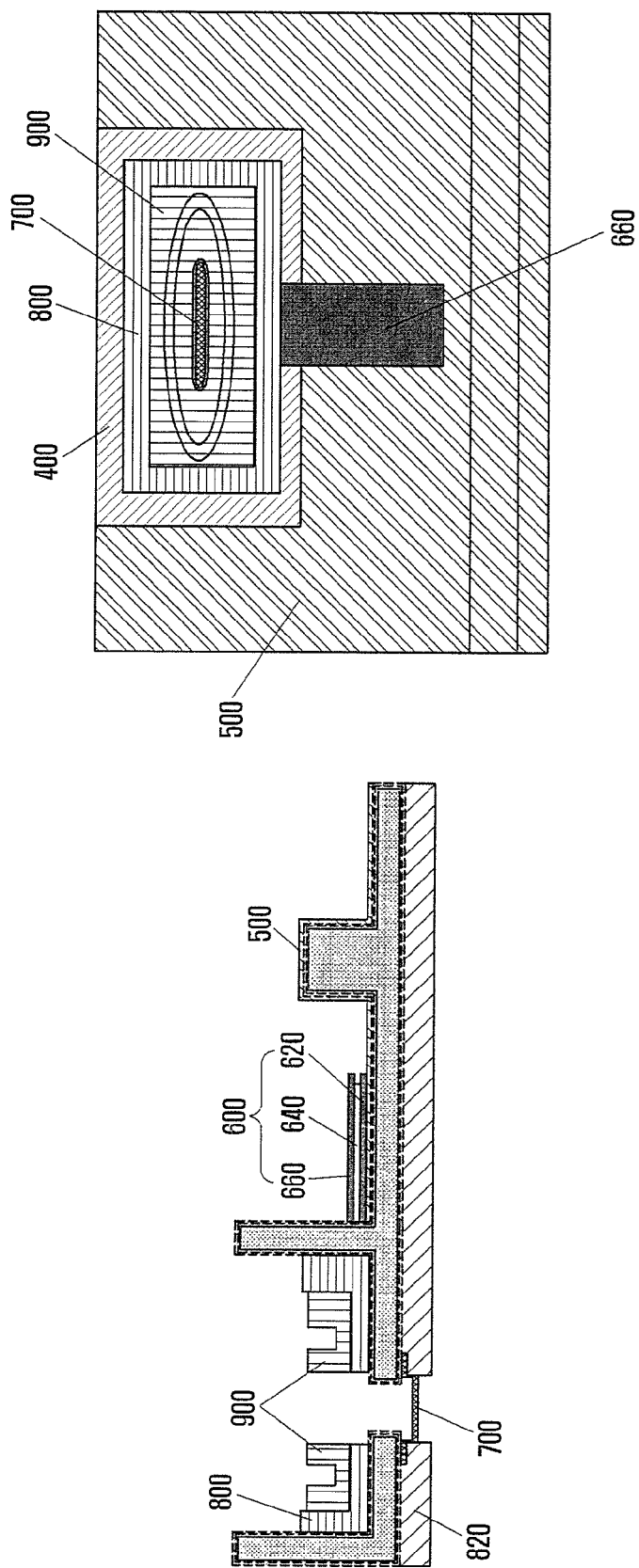

Thereafter, as shown in FIG. 12, the magnet 900 having a groove in a portion of an upper surface is fixed on the injection structure 800 of the first area (operation S109). That is, the magnet 900 has a groove in a portion of an upper surface thereof along a circumference of the container-shaped inside of the first area bracket 200.

Figure 13:
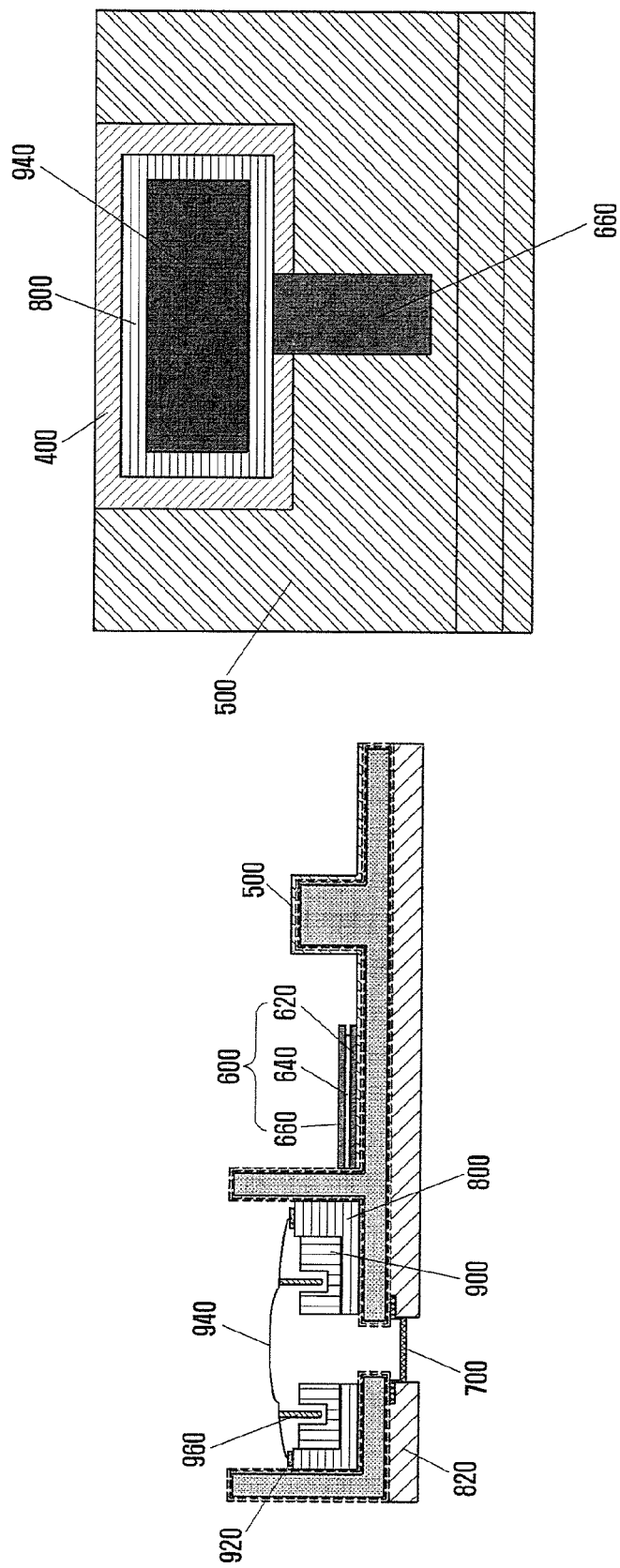

Thereafter, as shown in FIG. 13, at the container-shaped inside of the first area bracket 200, the diaphragm 940 covers an upper portion of the magnet 900 and the receiver mesh 700 (operation S110).

Figure 14:
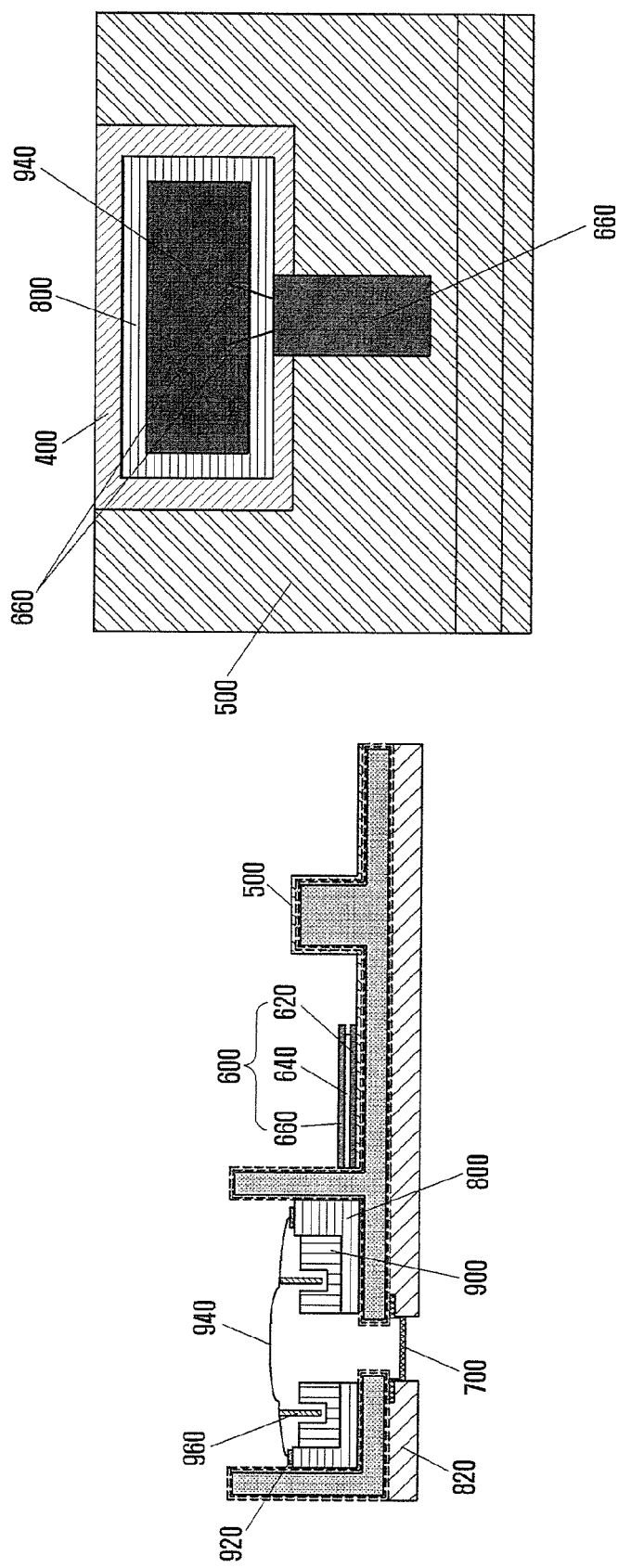

Thereafter, as shown in FIG. 14, in an upper portion of the magnet 900, the coil 960 facing the groove is fixed to the diaphragm 940 (operation S111).

Figure 15:
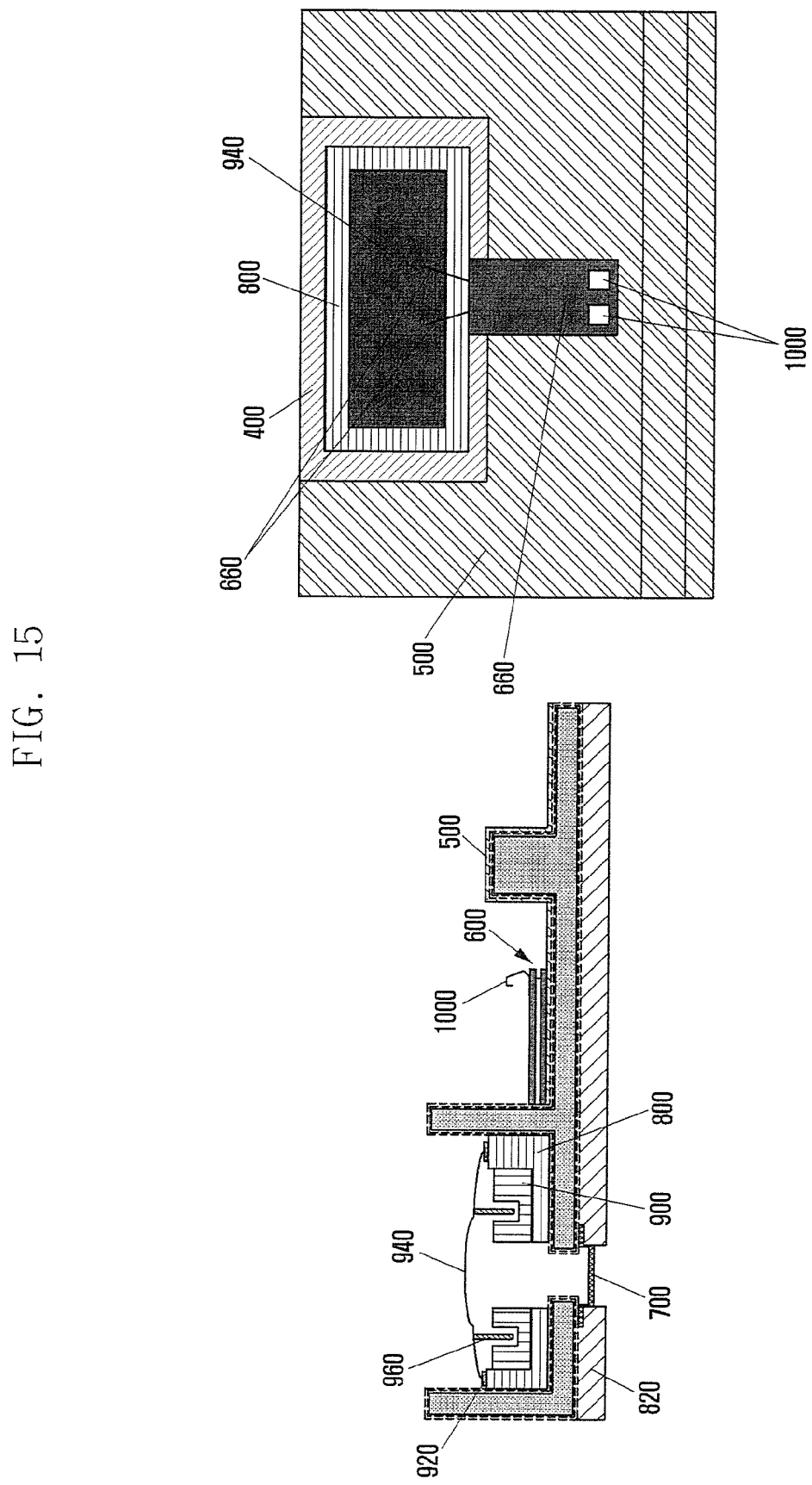
Figure 16:
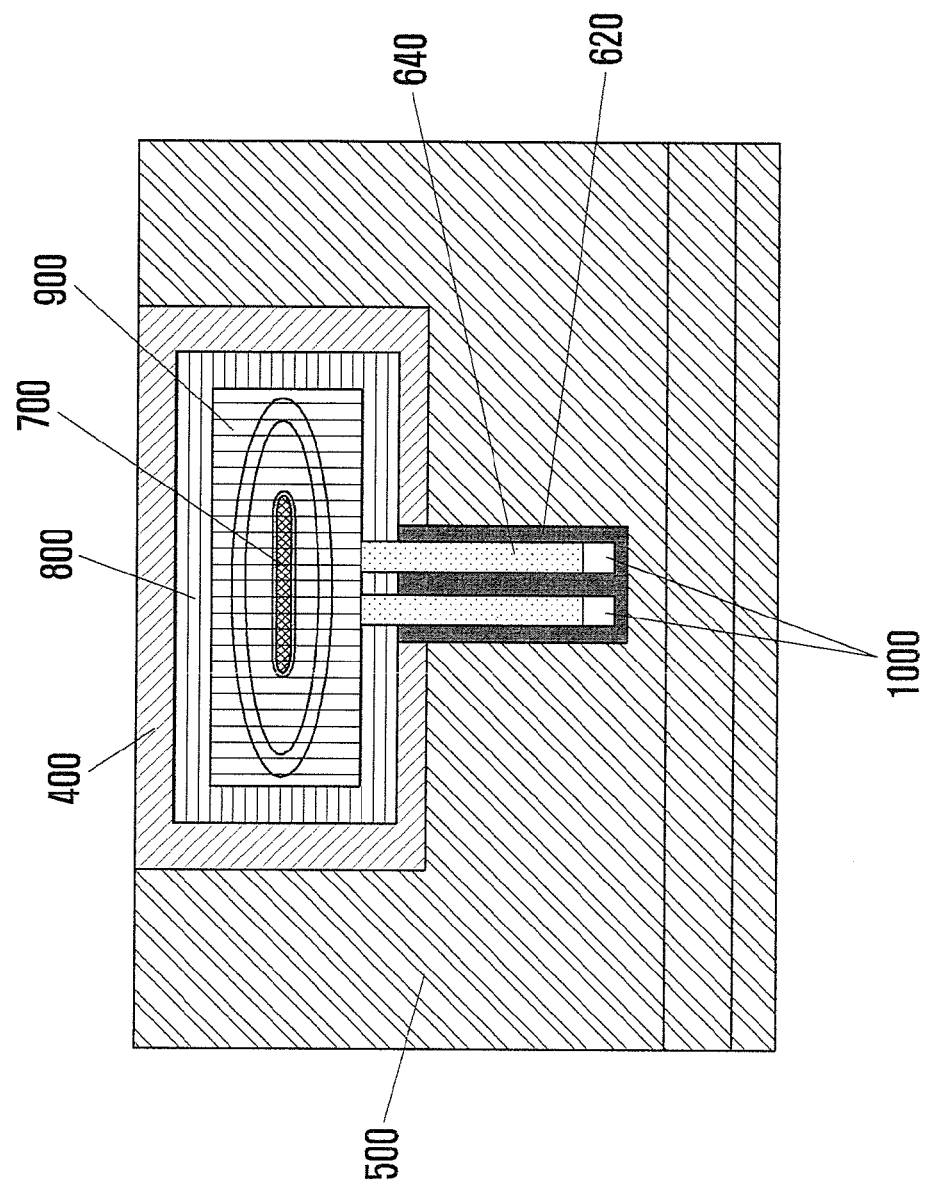

Thereafter, as shown in FIGS. 15 and 16, a PCB connecter 1000 connected to the conductive layer 640 disposed at an upper portion of the contact film 600 and constituting the contact film 600 is formed (operation S112). The PCB connecter 1000 may be formed in a structure of the finger contact portion 1000.

The finger contact portion 1000 finger contacts with the pad opening portion 2200 provided at a lower surface of the PCB 2000 disposed upward by a predetermined gap from a bottom surface of the second area bracket 200 and the conductive layer 640 extended from an upper surface of the second area bracket 200 to electrically connect the PCB 2000 and the receiver 100 (operation S113), as shown in FIG. 17.

The finger contact portion 1000 is extended from the contact film 600 to have a structure integrally formed with the contact film 600 and is separately formed with the contact film 600 to have a structure that electrically contacts with the contact film 600 later and a connection structure thereof is not limited thereto.

In the finger contact portion 1000, an area contacting with the contact film 600 may be formed greater than or equal to an area contacting with the pad opening portion 2200, as shown in FIG. 17, and a shape and a structure of the finger contact portion 1000 are not limited thereto.

As described above, in a receiver and a mobile terminal device having the same according to the present disclosure, an internal component having a receiver in a bracket can be formed in an internal structure, and by using dead space that is not conventionally used, a thickness of the mobile terminal device can be reduced.

Further, in the present disclosure, by embodying a contact structure that connects a PCB by penetrating a bracket from the inside of a lower surface and/or a side wall of the bracket of the receiver, while a thickness of the mobile terminal device is reduced, secure coupling can be formed.

As an application example of the present disclosure, a mobile terminal device may be formed including a main circuit disposed upward by a predetermined gap from a bottom surface of a bracket, an electric material provided at the other side of the bracket separated by a predetermined gap from the main circuit and mounted in the container-shaped inside of the bracket in which a circuit is wired at the inside, and a contact portion electrically connected to the electric material and that connects the main circuit and the electric material by penetrating a hole formed at a lower surface and/or a side surface of the container-shaped bracket.

Here, the electric material may be at least one of a motor, camera, microphone, speaker, and receiver provided at the inside of the mobile terminal device.

As described above, in a receiver and a mobile terminal device having the same according to the present disclosure, an internal component having a receiver in a bracket can be formed in an integral structure, and by using dead space that is not conventionally used, a thickness of a mobile terminal device can be reduced.

Further, in a receiver and a mobile terminal device having the same according to the present disclosure, by embodying a contact structure that connects a PCB by penetrating a bracket from the inside of a lower surface and/or a side wall of a bracket of the receiver, while a thickness of the mobile terminal device is reduced, secure coupling can be formed.

Although the present disclosure has been described with an example embodiment, various changes and modifications may be suggested to one skilled in the art. It is intended that the present disclosure encompass such changes and modifications as fall within the scope of the appended claims.

What is claimed is:

1. A mobile terminal device, comprising:
    a bracket housed within the mobile terminal device, the bracket having a lower surface and at least one side wall;
    a main circuit spaced apart by a predetermined gap from the lower surface of the bracket;
    a receiver, provided at the other side of the bracket separated by a predetermined gap from the main circuit, comprising:
        a container shape defined by a portion of the lower surface of the bracket and the at least one side wall in which a circuit is wired within the bracket;
        a receiver mesh housed in an area in which a portion of a lower surface of the container shape is opened;
        a magnet mounted on an injection structure disposed in the container shape, the injection structure is molded at a periphery of the receiver mesh;
        a coil extended to face the magnet; and
        a diaphragm covers an upper portion of the receiver mesh and the magnet and the coil fixed to the diaphragm; and
    a contact portion extended from an internal circuit of the receiver such that the internal circuit of the receiver is electrically connected to the main circuit.

2. The mobile terminal device of claim 1, wherein the contact portion comprises:
    a film extended to a bracket of a lower portion of the main circuit from at least one of the inside of the lower surface and the at least one side wall of the bracket of the receiver portion; and
    a finger contact portion connected between the film and the main circuit and that finger contacts with a pad opening portion of the main circuit.

3. The mobile terminal device of claim 2, wherein the film has a structure in which a first insulation layer, a conductive layer, and a second insulation layer are sequentially stacked on the bracket.

4. A receiver of a mobile terminal device, the receiver comprising:
    a bracket having a lower surface and at least one side wall, the bracket comprising a first area having a container shape defined by a portion of the lower surface and the at least one side wall in which a portion of the lower surface is opened and a second area in which a main circuit board (PCB) is housed at the other side adjacent to the first area;
    a receiver mesh housed at the opened lower surface of the first area;
    an injection structure disposed in the container shape that exposes the receiver mesh;
    a magnet fixed on the injection structure and comprising a groove in a portion of an upper surface;
    a diaphragm fixed by a fixing point formed in an upper portion of the injection structure and that covers an upper portion of the magnet and the receiver mesh;
    a coil fixed to the diaphragm and extended to face the groove from the diaphragm; and
    a contact line extended from the inside of the first area of the bracket to the PCB and that electrically connects the PCB and an electric wire mounted within the bracket.

5. The receiver of claim 4, wherein the contact line is made of a conductive material connected from an electric wiring mounted within the bracket of the first area to a pad opening portion of the PCB.

6. The receiver of claim 4, wherein the contact line comprises:
    a film extended from at least one of the inside of the lower surface and the at least one side wall of the bracket of the first area to a bracket of the second area; and
    a finger contact portion connected between the film and the PCB to finger contact with a pad opening portion of the PCB.

7. A mobile terminal device, comprising:
    a bracket housed within the mobile terminal device, the bracket having a lower surface and at least one side wall;
    a main circuit spaced apart by a predetermined gap from the lower surface of the bracket;
    an electric material provided at the other side of the bracket separated by a predetermined gap from the main circuit and mounted at a container-shaped inside of the bracket in which a circuit is wired at the inside; and
    a contact portion electrically connected to the electric material and that penetrates a hole formed at a side surface or a lower surface of the container-shaped inside of the bracket and that connects the main circuit and the electric material.

8. The mobile terminal device of claim 7, wherein the electric material comprises at least one of a motor, camera, microphone, speaker, or receiver.

9. The mobile terminal device of claim 7, wherein the bracket is housed within the mobile terminal device.

10. The mobile terminal device of claim 8, wherein the receiver comprises:
    a diaphragm provided at the other side of the bracket separated by a predetermined gap from the main circuit.

11. The mobile terminal device of claim 8, wherein the receiver comprises:

a container shape in which a circuit is wired within the bracket.

12. The mobile terminal device of claim 11, wherein the receiver comprises:
   a receiver mesh housed in an area in which a portion of a lower surface of the container shape is opened.

13. The mobile terminal device of claim 12, wherein the receiver comprises:
   a magnet mounted on an injection structure molded at a periphery of the receiver mesh, wherein a diaphragm covers an upper portion of the receiver mesh and the magnet and a coil fixed to the diaphragm and facing the magnet.

14. The mobile terminal device of claim 8, wherein the receiver comprises:
   a contact portion extended from an internal circuit of the receiver such that the internal circuit of the receiver is electrically connected to the main circuit.

15. The mobile terminal device of claim 14, wherein the contact portion comprises:
   a film extended to a bracket of a lower portion of the main circuit from at least one of the inside of a lower surface and a side wall of the bracket of the receiver.

16. The mobile terminal device of claim 15, wherein the contact portion comprises:
   a finger contact portion connected between the film and the main circuit and that finger contacts with a pad opening portion of the main circuit.

17. The mobile terminal device of claim 15, wherein the film has a structure in which a first insulation layer, a conductive layer, and a second insulation layer are sequentially stacked on the bracket.

18. The mobile terminal device of claim 12, wherein the receiver mesh comprises:
   a structure in which a plurality of through-holes.

* * * * *